PAY-TELEVISION RECEIVER HAVING PROGRAM SELECTION ACCORDING TO AMOUNT OF PREPAYMENT

Filed Oct. 10, 1961

WILLIAM C. RUBINSTEIN
GEORGE BROWNSTEIN
*INVENTORS.*

BY Lyon & Lyon
ATTORNEYS.

United States Patent Office 3,192,313
Patented June 29, 1965

3,192,313

PAY-TELEVISION RECEIVER HAVING PROGRAM SELECTION ACCORDING TO AMOUNT OF PRE-PAYMENT

William C. Rubinstein, Van Nuys, and George Brownstein, Pacoima, Calif., assignors to Paramount Pictures Corporation, New York, N.Y., a corporation of New York Filed Oct. 10, 1961, Ser. No. 144,091
7 Claims. (Cl. 178—5.1)

This invention relates to a pay-television system and, more particularly, to improvements therein.

Because of the large number of subscribers to a pay-television system, it is important that the equipment installed at each one of the subscriber's premises be as simple and inexpensive as possible. However, this cannot be extended to the point where certain basic, necessary operations are impaired. For example, in a presently operated subscription-television system at each subscriber receiver, it is necessary to indicate a price which must be paid for viewing a program, to collect the payment of that price, and then to make the program available to the subscriber. A program-distribution system must be provided to enable a subscriber to make a selection of one of several programs presented for purchase. Preferably, some means is also provided for making a recording indicative of the program for which payment has been made. Finally, some means must be provided for terminating the reception of the subscriber receiver who has paid for a program, so that a charge for another program may be made.

Accordingly, an object of this invention is the provision of a subscription-television system which provides all the indicated facilities in a simple and uncomplicated attachment for a subscriber's television receiver.

A further object of this invention is the provision of a subscription-television system having a simple and inexpensive arrangement for enabling a subscriber to select from a multiplicity of entertainment channels the channel for which he makes payment.

Another object of this invention is the provision of a simple pricing arrangement for a multiplicity of pay-television channels.

Yet another object of this invention is the provision of an attachment for integrating a commercial television receiver into a subscription-television system, which does not use any active electronic circuit components.

Still another object of the present invention is the provision of a novel and inexpensive attachment for integrating a commercial-television receiver into a subscription-television system of the type described.

These and other objects of the invention may be achieved by a television receiver attachment in accordance with this invention, which is connected between the subscription-television distribution cable and a subscriber's television set. This attachment will include mechanism such as a coinbox, into which coins may be deposited to select one out of a plurality of different subscription-television channels which it is desired to view. Each one of these channels carries a regular television program modulated on a different carrier, each having the frequency of the carriers used for channel 1 through channel 13, as approved by the Federal Communications Commission. Deposit of coins into the coin box enables a channel-selecting mechanism to be operated which disconnects a filter which previously bypassed the program on the selected channel. The program is then permitted to be applied to the antenna terminals of the subscriber's television receiver for viewing. Provision is made for making a recording indicative of the program which has been selected. Provision is also made for reinserting the filter if the subscriber desired to purchase another program or at the end of the program purchased.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
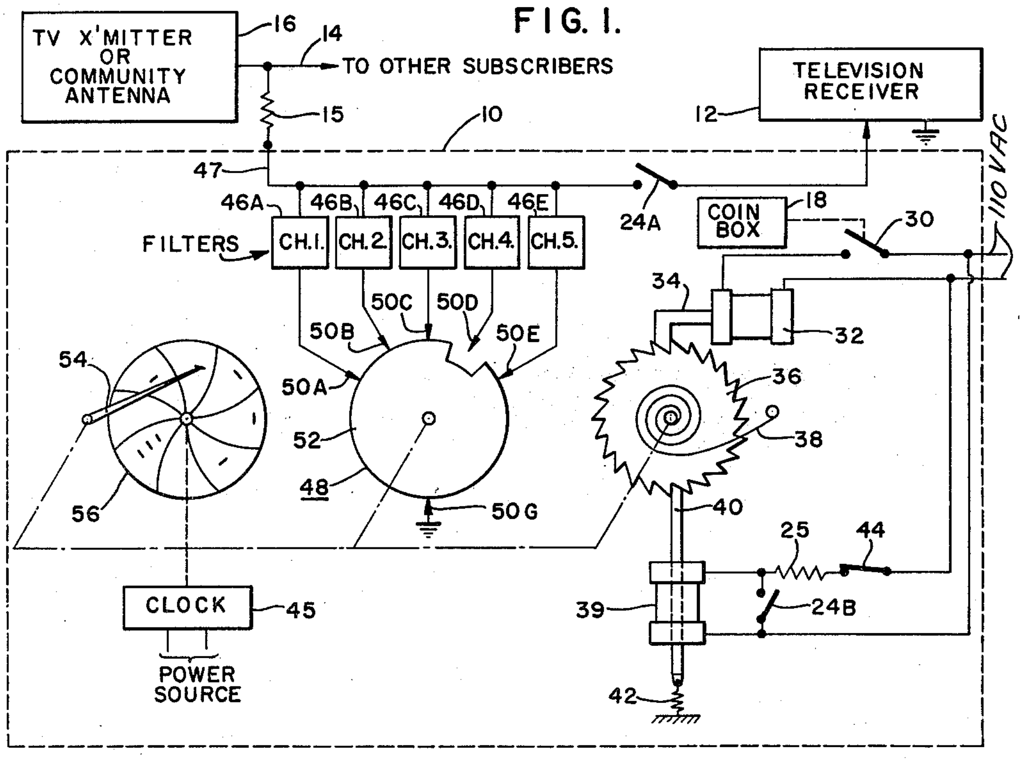
FIGURE 1 is a schematic drawing of an embodiment of the invention.

Reference is now made to FIGURE 1, which is a schematic drawing of an embodiment of the invention. This comprises an attachment 10, which is connected between the antenna terminals of a commercial television receiver 12 at a subscriber's location and a source of television program signals. The television program signals may be obtained, by way of example, from a television transmitter 16 or community-antenna arrangement which is connected to a distributing cable 14. The attachment 10 is connected to the distributing cable 14 through a suitable isolating impedance 15.

Figure 2:
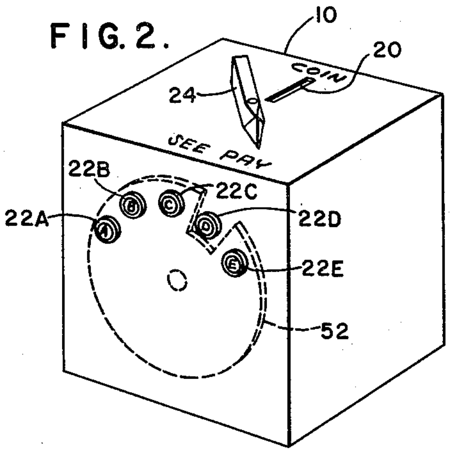
FIGURE 2 is an isometric view of the appearance of the coin box portion of an embodiment of the invention.

The attachment will include a coin box, the appearance of which is shown in FIGURE 2. This coin box includes a slot 20, into which coins may be deposited in order to select the one of a plurality of television channels over which a program desired to be viewed is being transmitted. The cost for obtaining each one of these channels is known in advance and may be provided, either by posted prices on the coin box, by newspaper advertisements, or by mailed information. On the front of the coin box 18 there are a plurality of indicators 22A, 22B, 22C, 22D, 22E, which serve the function of indicating which one of the channels has been purchased. These may be selectively illuminated by a simple switch which is actuated by channel-selecting apparatus, to be described subsequently herein.

Adjacent the coin slot 20 on top of the coin box is a pivotable switch 24, which will hereafter be designated as the "pay-see" switch. This switch can be pivoted to either cover the coin slot when it is in its "see" position or to uncover the coin slot when it is in its "pay" position.

Figure 3:
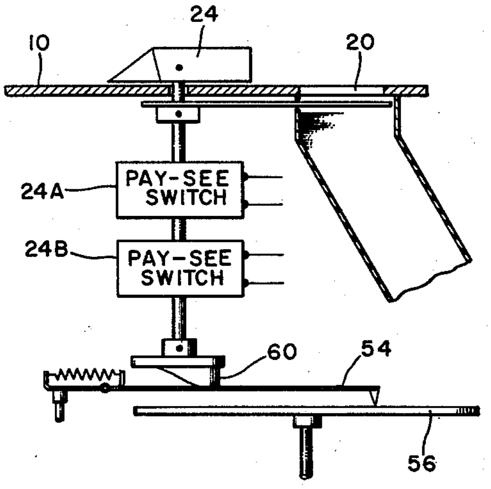
FIGURE 3 is a view of a portion of the coin box, showing details of the pay-see switch.

Referring to FIGURE 1 and as shown in detail in FIGURE 3, it should be noted that the pay-see switch has two switch sections, ganged to operate together. These sections are respectively 24A and 24B. Switch section 24A which, when closed (in the see position), connects the transmission line 14 to the antenna terminals of the receiver. Switch section 24B is connected across the input terminals of a solenoid 38. Switch section 24B is of the type which momentarily closes only when switch 24 is moved from the see to the pay position. Resistor 25 drops the line voltage when switch 24B is closed. Otherwise, it remains open. When it is desired to deposit coins into the coinbox, the pay-see switch is operated to uncover the coin slot, which causes the switch section 24A to be moved to its open position and switch section 24B to be momentarily closed. Each coin deposited serves to operate a switch 30 a number of times, as determined by the value of the coins deposited.

The switch 30 is connected to the power line in order to furnish power to a solenoid 32. This solenoid, when excited, moves a pawl 34. Thus, the pawl 34 operates a number of times as determined by the value of coins deposited. The pawl 34 engages a ratchet gear 36 and moves it from a home position over a proportionate amount of arc. The ratchet gear 36 is spring-biased by a spring 38 to a home position. It is maintained at the position to which it has been rotated by means of another solenoid 39, the armature 40 of which, when the solenoid 39 is excited, is held in contact with the ratchet teeth of the ratchet gear 36. This armature 40 is biased by a spring 42 to be pulled out of engagement of the ratchet teeth when the solenoid 39 is deenergized. The same source of power that is used to excite the solenoid 32 is applied to the solenoid 39 through a clock switch 44, which is normaly closed but may be operated to its open position by a clock 45 at a predetermined time. It should be appreciated that whenever switch 44 is momentarily closed, it drops the voltage applied to solenoid 39, whereby spring 42 can pull the pawl 40 out of engagement with the gear 36, enabling it to return to its home position. Switch 24B is momentarily closed, as previously stated, when the pay-see switch is moved from its see to its pay position.

In summary of what has been described thus far, when a subscriber wishes to purchase a television program, he moves the pay-see switch 24 away from the coin opening of the coin box, thus resetting all apparatus to a starting position. He then deposits into the coin box the value of the coinage which has been indicated as the purchase price of a desired program. The coin box operates a solenoid and pawl which actuates a ratchet gear, rotating it through an arc whose length effectively represents the value of the coinage which has been deposited. Indication is provided by the indicators 22A through 22E of the channel for which payment is made. An additional selector-switch section may be employed for selectively illuminating light bulbs serving as indicators, or illumination from within the coinbox may be enabled to pass through one of a plurality of translucent indicators on which the channel designation is painted when the slot in the common contact 52 is positioned adjacent thereto.

A plurality of filters, respectively 46A through 46E, are connected between a cable 47, which connects the distribution cable coming from the television transmitter through switch section 24A to the antenna terminals of the subscriber's television receiver and a selecting-switch mechanism 48. Effectively, this selecting switch mechanism 48 constitutes a plurality of terminals 50A through 50E and a rotatable common contact 52. Each of the terminals 50A through 50E is connected to a different one of the filters, respectively 46A through 46E. The rotatable common contact 52 is connected to ground. The common contact is formed so that when it is at a home position, all of the terminals 50A through 50E are connected to ground through terminal 50G, and, when operated to a selecting position by means of the mechanical ganging with the rack gear 36, the filter associated with the channel for which payment has been made is disconnected. Each of the other filters serves to bypass each of the other program transmissions on the other channels to ground.

In addition to the common contact 52 of the selector switch 48 being ganged to be operable with the ratchet gear 36, a pen 54 is also ganged to the selector switch to be operable therewith. The pen is positioned over a predesignated portion of a clock-driven chart 56, which is associated with the channel position of the switch 48. The clock-driven chart 56 is driven by the same clock 45 as drives the clock-operated switch 44.

After payment for a program which he desires to view, a subscriber operates the pay-see switch 24 to its "see" position. Thereby, switches 24A and 24B are closed, which enables the subscriber's receiver to receive and commence reproduction of the program coming over the selected channel. As may be seen in FIGURE 3, the pay-see switch 24 includes the two switch sections 24A and 24B and, in addition, it actuates a cam 60, which serves the function of pressing down upon the pen 54 for the purpose of causing it to make a mark on the recording paper 56 at the location to which the pen has been moved.

The subscriber will remain connected to the line, and the filter which would otherwise prevent his seeing the program on the channel being received will remain out of the circuit until one of a number of events takes place. If the subscriber moves the pay-see switch from the "see" to the "pay" position, this will momentarily close the switch section 24B, whereby the solenoid 38 is momentarily de-energized, enabling the ratchet gear 36 to return to the home position, carrying with it the selector switch 48 and the pen 54. As a result, the subscriber can no longer receive a program over the channel for which he has made payment. The subscriber can move the pay-see switch when the purchased program is terminated and he wishes to purchase a program on another channel.

If the subscriber does not move the pay-see switch back from the see to the pay position, he will remain connected to the pay channel until such time as the clock-operated switch 24 is operated momentarily open by the clock. Such operation can be established for any suitable time—for example, at two or three o'clock in the morning, when all programs are off the air. This will cause the dropping out of all the subscriber-television receivers, regardless of the position of the pay-see switch.

It was previously pointed out that the recorder is clock driven. The recorder may be a circular chart recorder which makes one complete revolution in 120 days. The operated switch 44 may be operated from this clock, or, if desired, may be operated by a drop-out signal transmitted from the transmitter and detected by suitable circuitry at each subscriber receiver.

In place of the separate filters, it may be preferable to use a separate crystal filter which is tuned to the video carrier of each one of the channels. With a filter connected as shown, the video carrier is bypassed, as a result of which both sound and video cannot be reproduced by the television receiver.

There has accordingly been described and shown herein a novel, useful, and simple arrangement using only passive components, whereby program selection in a subscription-television system is effectuated by payment of a predetermined amount of money. A recording is made, as well as provision for affording collection of payment for any subsequent programs to be viewed at the termination of the program for which payment has already been made.

We claim:

1. In a subscription-television system of the type wherein each of a plurality of television programs are distributed to subscriber receivers over cable, each of said television programs costing a different price which price must be paid before said program is presented on a subscriber's receiver, an attachment connected between said cable and the antenna terminals of a subscriber's receiver, said attachment including means for receiving coinage equivalent to the price of a predetermined one of said television programs and for providing an output indicative thereof, selecting means operated responsive to the output of said means for receiving coinage for selecting for application to said subscriber's receiver antenna terminals only the program the price of which has been paid, and means for resetting said means for receiving coinage and said selecting means to prevent application of any program to said subscriber's receiver antenna terminals to enable payment for another program.

2. In a subscription-television system as recited in claim 1 wherein there is included an inoperative means for making a recording, means for positioning said recording means responsive to the output of said means for receiving coinage to make a recording indicative of the program for which payment has been made, and means for rendering said recording means operative to make said recording prior to viewing a program payment for which has been made.

3. In a subscription-television system of the type wherein each of a plurality of television programs are distributed to subscriber receivers over a line, each of said television programs costing a different price which price must be paid before said program is presented on a subscriber's receiver, an attachment connected between said line and the antenna terminals of a subscriber's receiver, said attachment including means for receiving coinage equivalent to the price of a predetermined one of said television programs and for providing an output indicative thereof, circuit means operated in response to the output of said means for receiving coinage for preventing the application to the antenna terminals of said subscriber receiver of all television programs but the one for which payment into said coin box has been made, and means for resetting said coinbox to enable payment for another program, said circuit means being operated in response to the output of said coinbox when reset to prevent application of any television programs to the antenna terminals of said subscriber receiver.

4. In a subscription-television system of the type wherein each of a plurality of television programs are distributed to subscriber receivers over a line, each of said television programs costing a different price which price must be paid before said program is presented on a subscriber's receiver, an attachment connected between said line and the antenna terminals of a subscriber's receiver, said attachment including means for receiving coinage equivalent to the price of a predetermined one of said television programs and for providing an output indicative thereof, switch means coupled between the input to said attachment and said antenna terminals of said subscriber's receiver, said switch means having a closed position at which a connection is made between said attachment input and said antenna terminals and an open position at which said connection is broken, said switch means including lever means for operating said switch means between said closed and open positions, said lever means including means to prevent deposit of coinage into said means for receiving coinage when said switch means is in its closed position and to enable deposit of coinage when said switch means is in its open position, circuit means connected in series with said switch means and with the input to said attachment, said circuit means being operable in response to the output of said means for receiving coinage for preventing the application to the antenna terminals of said subscriber receiver of all television programs but the one for which payment into said coin box has been made, and means actuated in response to actuation of said switch means from its closed to its open position for resetting said coin box to enable payment for another program, said circuit means being operated in response to the output of said coin box when reset to prevent application of any television programs to the antenna terminals of said subscriber receiver.

5. In a subscription-television system as recited in claim 4 wherein there is included an inoperative means for making a recording, means for positioning said recording means responsive to the output of said means for receiving coinage to make a recording indicative of the program for which payment has been made, and means responsive to said switch means being operated from its open to its closed position to render said recording means operative to make said recording.

6. In a subscription-television system as recited in claim 4 wherein said circuit means includes a plurality of filters each of which is tuned to present a minimal impedance to a different one of the television programs being transmitted, selecting switch means, means connecting said plurality of filters between said switch means and said selecting switch means, a ground terminal, said selecting switch means including a movable common contact connected to said ground terminal and having an initial position at which it connects to all said filters and succeeding positions at each of which a different one of said filters is not connected to said common contact, means to apply output from said means to receive coinage to said movable common contact to move it to the one of said succeeding positions at which the filter tuned to the television program selected is disconnected from said common contact.

7. In a subscription-television system as recited in claim 6 wherein said means for receiving coinage and for producing an output indicative of the coins received includes a ratchet gear, means for biasing said ratchet gear to a reset position, means for moving said ratchet gear through an arc representative of the value of coins deposited in said coin box, a solenoid, holding means responsive to said solenoid being maintained operative to hold said ratchet gear to an actuated position against said means for biasing, and means coupling said ratchet gear to said selecting switch to operate said selecting switch therewith, and said holding means actuated in response to actuation of said switch means from its closed to its open position for resetting said coin box includes momentary switch means connected across the input to said solenoid to divert operating potential therefrom to render said solenoid inoperative when said momentary switch means is closed.

References Cited by the Examiner

UNITED STATES PATENTS

| | | | |
|---|---|---|---|
| 3,021,383 | 2/62 | Mountjoy | 178—5.1 |
| 3,051,775 | 8/62 | Novak | 178—5.1 |

DAVID G. REDINBAUGH, *Primary Examiner.*

ROY LAKE, *Examiner.*